（12） United States Patent
Gressick et al.

(10) Patent No.: US 12,434,105 B1
(45) Date of Patent: Oct. 7, 2025

(54) SYSTEM, DEVICE AND METHOD FOR MULTI-PLANE EVALUATION OF POSTURAL HEALTH

(71) Applicant: Barron Associates, Inc., Charlottesville, VA (US)

(72) Inventors: William T. Gressick, Charlottesville, VA (US); Brian R. Clark, Charlottesville, VA (US)

(73) Assignee: Barron Associates, Inc., Charlottesville, VA (US)

( * ) Notice: Subject to any disclaimer, the term of this patent is extended or adjusted under 35 U.S.C. 154(b) by 169 days.

(21) Appl. No.: 18/415,108

(22) Filed: Jan. 17, 2024

Related U.S. Application Data

(60) Provisional application No. 63/454,090, filed on Mar. 23, 2023.

(51) Int. Cl.
*A63B 26/00* (2006.01)
*A63B 24/00* (2006.01)
*A63B 22/16* (2006.01)

(52) U.S. Cl.
CPC ........ *A63B 26/003* (2013.01); *A63B 24/0087* (2013.01); *A63B 22/16* (2013.01); *A63B 2220/51* (2013.01); *A63B 2220/54* (2013.01); *A63B 2220/806* (2013.01)

(58) Field of Classification Search
CPC ... A63B 26/003; A63B 24/0087; A63B 22/16; A63B 2220/51; A63B 2220/54; A63B 2220/806
See application file for complete search history.

(56) References Cited

U.S. PATENT DOCUMENTS

| | | | |
|---|---|---|---|
| 11,540,744 B1* | 1/2023 | Berme | A63B 24/0087 |
| 2007/0207900 A1* | 9/2007 | Huang | A63B 69/18 |
| | | | 482/51 |
| 2011/0039669 A1* | 2/2011 | Stewart | A63B 69/0053 |
| | | | 482/146 |
| 2011/0196270 A1* | 8/2011 | Fuster | A63B 22/18 |
| | | | 601/53 |
| 2011/0256983 A1* | 10/2011 | Malack | A63B 21/4015 |
| | | | 482/4 |

(Continued)

*Primary Examiner* — Sundhara M Ganesan
(74) *Attorney, Agent, or Firm* — Williams Mullen; Thomas F. Bergert

(57) ABSTRACT

Embodiments of a balance device can include one, two or three of a medial-lateral curved track assembly, an anterior-posterior curved track assembly and a linear slide assembly. The balance device can be employed as part of a system further including, a camera-based motion tracking system communicably coupled to the balance device and a visual subsystem communicably coupled to the motion tracking system and operable to manipulate visual feedback to the user during operation of the balance device. Embodiments of a method according to the present disclosure include receiving measurements of a plurality of forces and a plurality of moments acting on a balance platform of a balance device, estimating a plurality of non-user force measurements and a plurality of non-user moment measurements caused by gravity and inertial accelerations, determining a compensation adjustment and implementing the compensation adjustment to the balance platform.

20 Claims, 7 Drawing Sheets

(56) References Cited

U.S. PATENT DOCUMENTS

| | | | | |
|---|---|---|---|---|
| 2011/0263398 A1* | 10/2011 | Klassen | ............. | A63B 21/4034 |
| | | | | 482/146 |
| 2011/0312473 A1* | 12/2011 | Chu | ................... | A63B 69/0053 |
| | | | | 482/54 |
| 2013/0274079 A1* | 10/2013 | Hockridge | ......... | A63B 21/4033 |
| | | | | 482/142 |
| 2014/0378876 A1* | 12/2014 | Malosio | ................. | A61H 1/005 |
| | | | | 601/5 |
| 2015/0328497 A1* | 11/2015 | Doucot | .............. | A63B 69/0057 |
| | | | | 482/146 |
| 2017/0132947 A1* | 5/2017 | Maeda | ................... | G05G 9/047 |
| 2018/0110670 A1* | 4/2018 | Saglia | ................... | A61H 1/0266 |
| 2019/0030399 A1* | 1/2019 | D'Alesio | ........... | A63B 69/0057 |
| 2019/0060152 A1* | 2/2019 | Wang | ................... | A61H 1/0214 |
| 2019/0209891 A1* | 7/2019 | Fung | ..................... | G06F 3/0338 |
| 2019/0282878 A1* | 9/2019 | Gouzenko | ............ | A63B 26/003 |
| 2020/0330822 A1* | 10/2020 | Kim | ........................ | A63B 23/08 |
| 2021/0245012 A1* | 8/2021 | Kumar | ............. | A63B 21/00181 |
| 2022/0339505 A1* | 10/2022 | Turner | ................. | A63B 26/003 |

\* cited by examiner

SYSTEM, DEVICE AND METHOD FOR MULTI-PLANE EVALUATION OF POSTURAL HEALTH

CROSS-REFERENCE TO RELATED APPLICATIONS

This application claims the benefit of U.S. Provisional Patent Application No. 63/454,090 filed on Mar. 23, 2023, the disclosure of which is incorporated herein by reference in its entirety.

STATEMENT

This invention was made with government support under contract no. W81XWH21P0103 awarded by the United States Army. The government has certain rights in the invention.

TECHNICAL FIELD

The present disclosure relates generally to personal health and more particularly to a system, device and method for assessing postural health and providing balance training.

BACKGROUND AND SUMMARY

Posture and balance are important aspects of an individual's health. Poor or impaired balance can lead to accidents and injuries. Past systems for diagnosing balance disorders and/or training patients with impaired balance have suffered from one-dimensionality, simplicity and other limitations.

The present disclosure relates to a system, device and method for sensory testing and balance limit evaluation that helps address these and other past deficiencies. In various embodiments, the presently disclosed system, device and method provide a compact, portable, and affordable means of evaluating a patient's postural control (balance) systems and performs postural assessments. A virtual reality headset can be used to manipulate the vision feedback. In various embodiments, the system enables motion expansion to multiple planes.

According to embodiments, the present system, device and method can provide extensive capabilities beyond existing balance testing technology. The system is portable and compact and is operable to provide multi-axis motion. For example, in various embodiments, two rotation axes and one linear axis are provided. It will be appreciated that the modular addition of motion axes permits cost savings in applications not requiring all three axes. Embodiments of the system provide for fully programmable motion gains, arbitrary motion profiles, an enhanced virtual reality (VR) experience with custom-designed environment processing software and the ability to show the subject's body and environment within the field of view. The system further provides for camera-based acquisition of body joint angles and related metrics during tests. The real-time measurement of body joint angles enables an alternative, improved method to perform sway-referenced platform control. Further, the system's motion and measurement capabilities allow expanded, multi-plane definition of metrics such as sway path energy and 360-degree limits of stability.

Embodiments of a balance device according to the present disclosure can include one, two or three of a medial-lateral curved track assembly, an anterior-posterior curved track assembly and a linear slide assembly. Embodiments of a system according to the present disclosure include a balance device, a camera-based motion tracking system communicably coupled to the balance device and a visual subsystem communicably coupled to the motion tracking system and operable to manipulate visual feedback to the user during operation of the balance device. Embodiments of a method according to the present disclosure include receiving measurements of a plurality of forces and a plurality of moments acting on a balance platform of a balance device, estimating non-user force measurements and non-user moment measurements caused by gravity and inertial accelerations, determining a compensation adjustment and implementing the compensation adjustment to the balance platform.

In addition to the diagnosis of balance disorders, various embodiments of the system can be used for training patients with impaired balance. Patient performance/progress can be monitored during rehabilitation and the effect of therapy can be seen.

DETAILED DESCRIPTION

Aspects of the present disclosure will now be described in more detail with respect to the description and methodologies provided herein. It should be appreciated that the disclosure can be embodied in different forms and should not be construed as limited to the embodiments set forth herein. Rather, these embodiments are provided so that this disclosure will be thorough and complete, and will fully convey the scope of the disclosure to those skilled in the art.

The terminology used in the description of the disclosure herein is for the purpose of describing particular embodiments only and is not intended to be limiting of the disclosure. As used in the description of the embodiments of the disclosure and the appended claims, the singular forms "a", "an" and "the" are intended to include the plural forms as well, unless the context clearly indicates otherwise. For example, a track segment can include one or more track segments, a processor can include one or more processors, and so forth. Also, as used herein, "and/or" refers to and encompasses any and all possible combinations of one or more of the associated listed items.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

Figure 1:
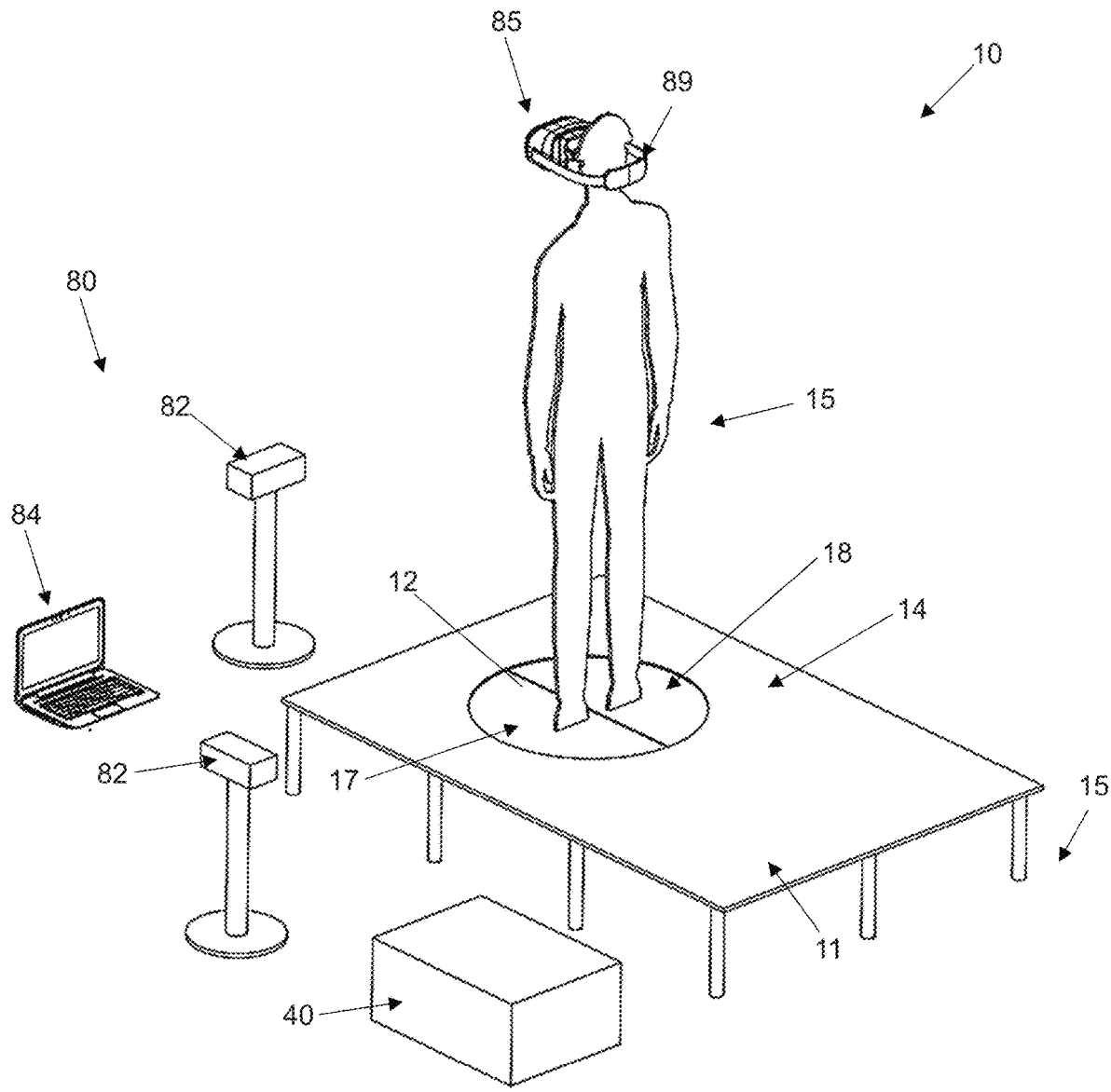
FIG. 1 is an illustration of embodiments of a device and system in accordance with the present disclosure.

Embodiments of the system 10 as illustrated in FIG. 1 provide a raised surface 11 including a balance platform 12 and a standing surface 14 that are raised above the level of the floor 15 in the environment where deployed. In various embodiments, the balance platform 16 includes a left foot plate 17 and a right foot plate 18.

Figure 2:
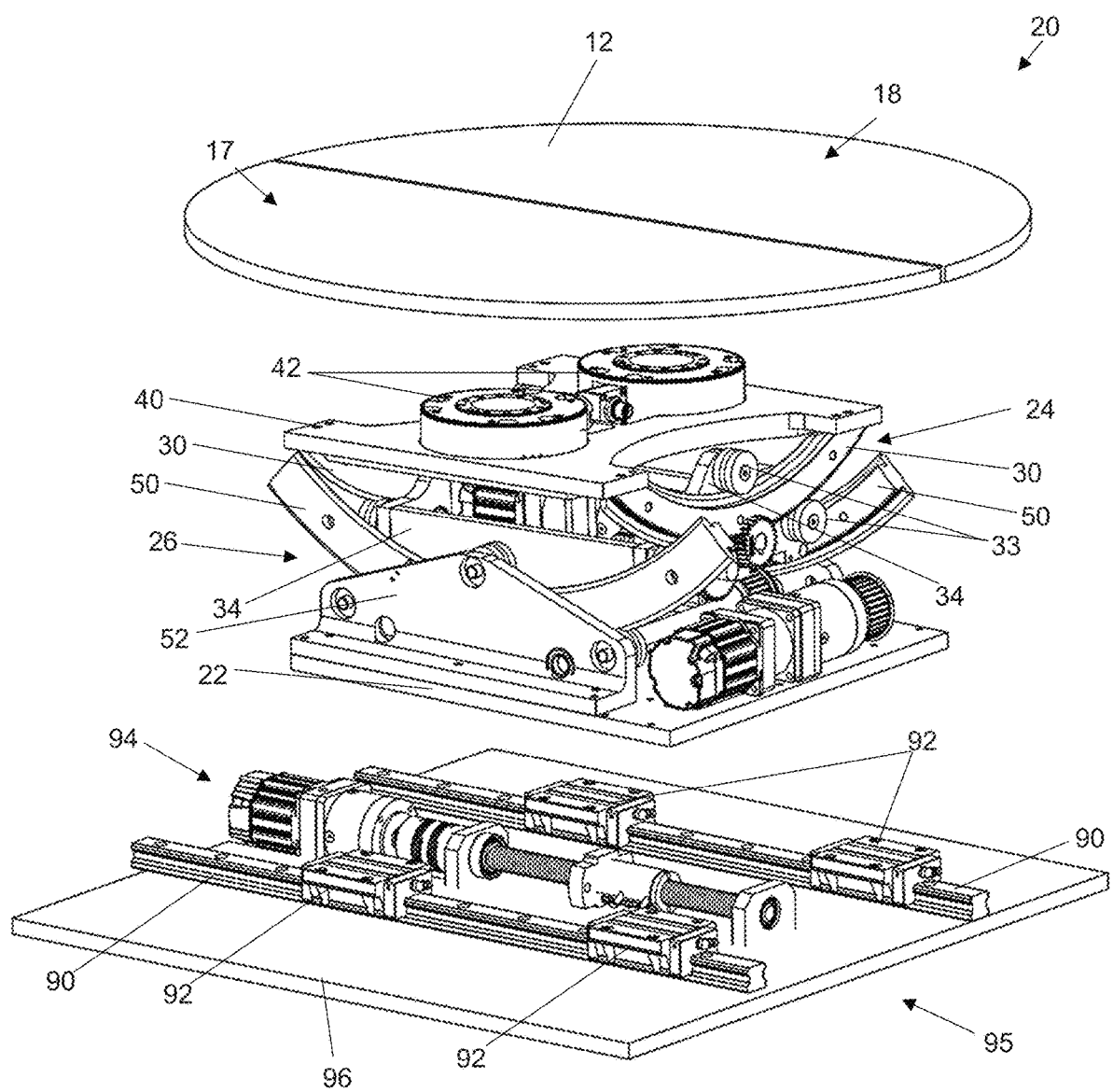
FIG. 2 is an exploded perspective view of an embodiment of a device in accordance with the present disclosure.
Figure 3:
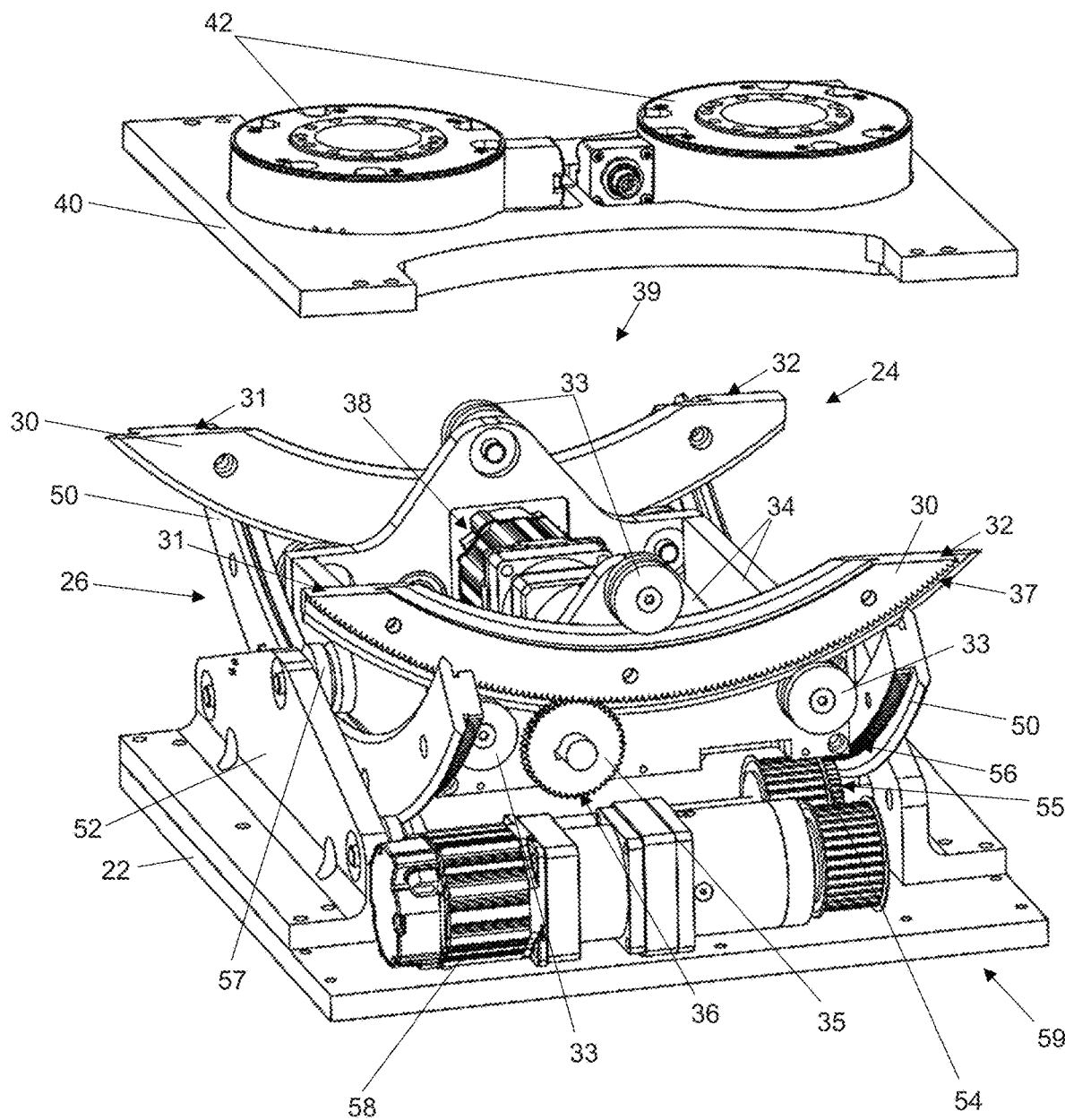
FIG. 3 is an exploded perspective view of an embodiment of elements of a device in accordance with the present disclosure.
Figure 4:
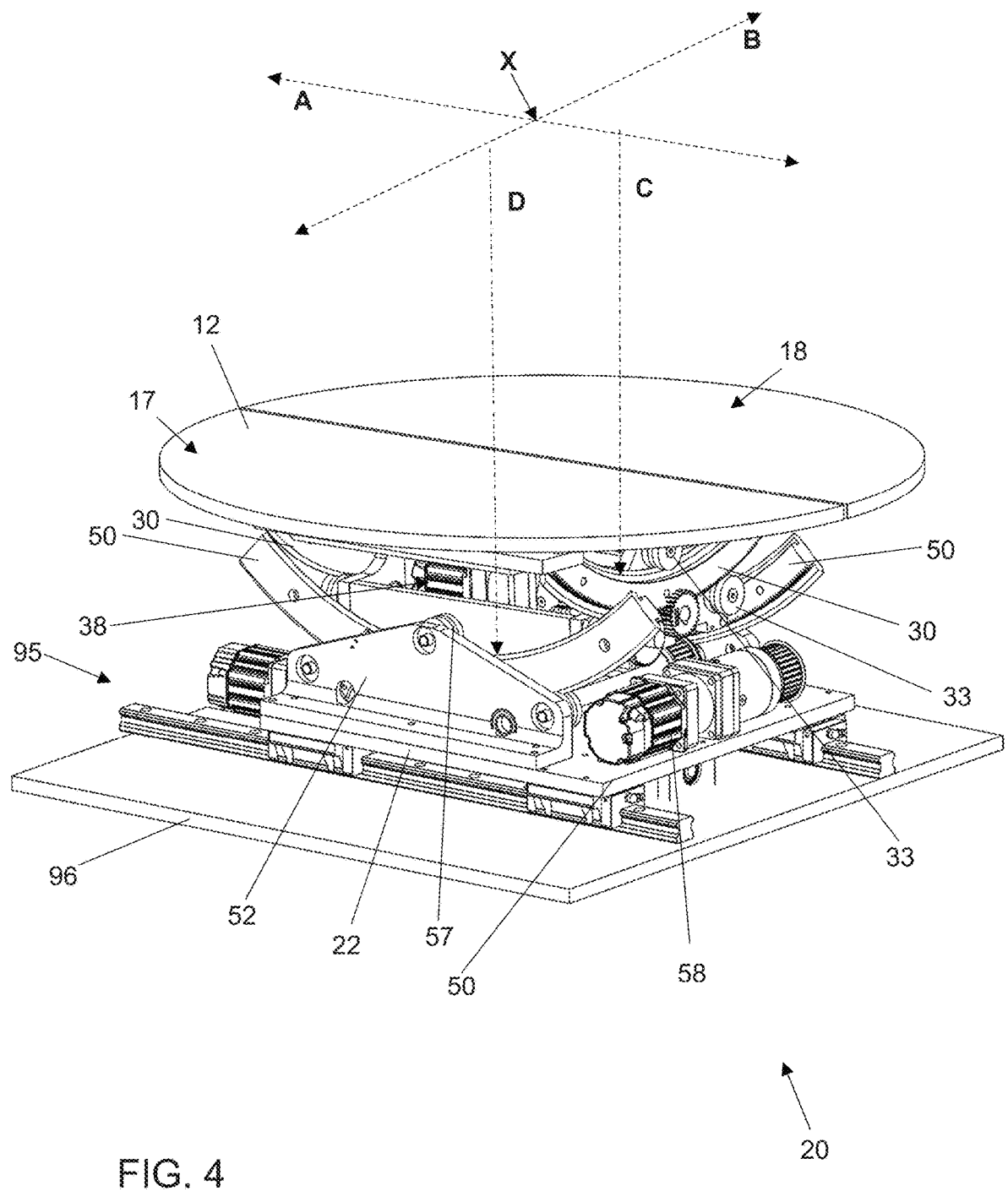
FIG. 4 is a perspective view of an embodiment of a device in accordance with the present disclosure.

As shown in FIGS. 2 through 4, the balance platform 12 is part of a balance device 20 that is movable about one or more axes (e.g., A, B in FIG. 4) and/or optionally linearly movable along one or more linear slide rails 90. The device 20 includes a base frame 22 and one or more curved track assemblies 24, 26. The upper or medial-lateral curved track assembly 24 includes a first pair of spaced curved track segments 30 secured to the base frame 22 in substantially parallel relation and rotatable about a first axis A. Each curved track segment 30 includes first 31 and second 32 end surfaces. The curved track segments 30 can be secured to the base frame 22 indirectly such as by being positioned within one or more V-groove bearings 33 secured to one or more frame members 34 wherein the frame members 34 can be secured to the base frame 22 and/or to another frame member (e.g., 52) secured to the base frame 22. In various embodiments, a drive gear 35 is secured to a frame member 34 and has gear teeth 37 that engage opposing teeth 37 on one of the curved track segments 30. The drive gear 35 is driven by a medial-lateral drive motor 38 secured directly or indirectly to the base frame 22. The frame member(s) 34, drive gear 35, medial-lateral drive motor 38 and V-groove bearings 33 on the frame member(s) 34 can be considered a medial-lateral drive assembly 39. The curved track assembly 24 and medial-lateral drive assembly 39 permit coronal plane (side-to-side) motion during operation of embodiments of the device 22 incorporating these elements, as the medial-lateral drive assembly 39 operates to rotationally drive the pair of spaced curve track segments 30 about the axis A.

The balance platform 12 is secured to the end surfaces 31, 32 of each curved track segment 30, either directly or indirectly. In embodiments where the balance platform 12 is secured indirectly to the end surfaces 31, 32 of each curved track segment 30, a support platform 40 is first secured to the end surfaces 31, 32 of each curved track segment 30. Optionally, one or more torque sensors 42 can be secured atop the support platform 40. The balance platform 12 is then secured atop either the support platform 40 or the torque sensor(s) 42. In various embodiments, the balance platform 12 is split with a first portion or left foot plate 17 of the balance platform 12 atop a first torque sensor 42 and a second portion or right foot plate 18 of the balance platform 12 atop a second torque sensor 42. A user stands on the balance platform 12 during operation of the device 20 and the medial-lateral curved track assembly 24 permits coronal plane motion.

As further shown in FIGS. 2 and 4, a linear slide rail assembly 95 can be provided as part of the device 20 in various embodiments and includes one or more linear slide rails 90 and one or more linear slides 92, which can be secured to the underside of the base frame 22, whereupon the base frame 22 is slidable in a translational direction along the linear slide rail(s) 90 during operation. This motion can be directed and/or influenced by a slide rail motor and gear arrangement 94 as shown in FIG. 2. In various embodiments, the linear slide rails 90 are secured to a ground platform 96 in substantially parallel relation. The linear slide rails 90 and linear slides 92 permit translational motion of the device 20, which can be employed for reflex testing, for example.

According to various embodiments as shown in FIGS. 2 through 4, the device 20 can optionally include an anterior-posterior curved track assembly 26 including a second pair of spaced curved track segments 50 secured to the base frame 22 in substantially parallel relation and rotatable about axis B. It will be appreciated that the pair of spaced curved track segments 50 can be substantially perpendicular to the first pair of spaced curve track segments 30. By "substantially" parallel or "substantially" perpendicular, embodiments of the present disclosure contemplate that the pairs of track segments need not be exactly or perfectly parallel or perpendicular but can be mostly, nearly or essentially parallel or perpendicular for desired operation consistent with the present disclosure.

The pair of curved track segments 50 can be secured to the base frame via a primary frame 52, which can be a respective pair of brackets according to embodiments of the present disclosure. A second curved track drive gear 54 can be secured to one of the brackets 52 where the curved track drive gear 54 includes gear teeth 55 for mating with opposing teeth 56 on one of the track segments 50 from the second pair of curved track segments. The curved track drive gear 54 is driven by an anterior-posterior drive motor 58 secured to the base frame 22. One or more V-groove bearings 57 can also be secured to one or both brackets 52 for guiding the pair of curved track segments 50 in rotation about the axis B. The primary frame 52, curved track drive gear 54, anterior-posterior drive motor 58 and V-groove bearings 57 on the primary frame can be considered an anterior-posterior drive assembly 59. The anterior-posterior curved track assembly 26 and drive assembly 59 permit sagittal plane (front-to-back) motion during operation of embodiments of the device 22 incorporating these elements, as the anterior-posterior drive assembly 59 operates to rotationally drive the second pair of spaced curve track segments 50 about the second axis B.

It will be appreciated that the first A and second B axes intersect above the balance platform 12 such as at intersection point X in FIG. 4. In operation, this intersection point can align with and/or be located at an ankle joint or other joint of a user (15 in FIG. 1) for proper biomechanical operation. Further, as shown in the embodiment of FIG. 4, the radial distance C from the first axis A to the first pair of spaced curved track segments is less than the radial distance D from the second axis B to the second pair of spaced curved track segments, such as when the medial-lateral curved track assembly 24 is nested within the anterior-posterior curved track assembly 26.

In embodiments including the medial-lateral curved track assembly 24 and the anterior-posterior curved track assembly 26, the one or more frame members 34 provide an intermediate frame and the medial-lateral drive motor 35 is operable to rotationally drive the first pair of spaced curve track segments 30 about the first axis A. As shown in FIGS. 2 and 3, the intermediate frame and the medial-lateral drive motor 35 of the medial-lateral curved track assembly 24 are nested within the anterior-posterior curved track assembly 26 according to embodiments of the present disclosure.

Figure 5:
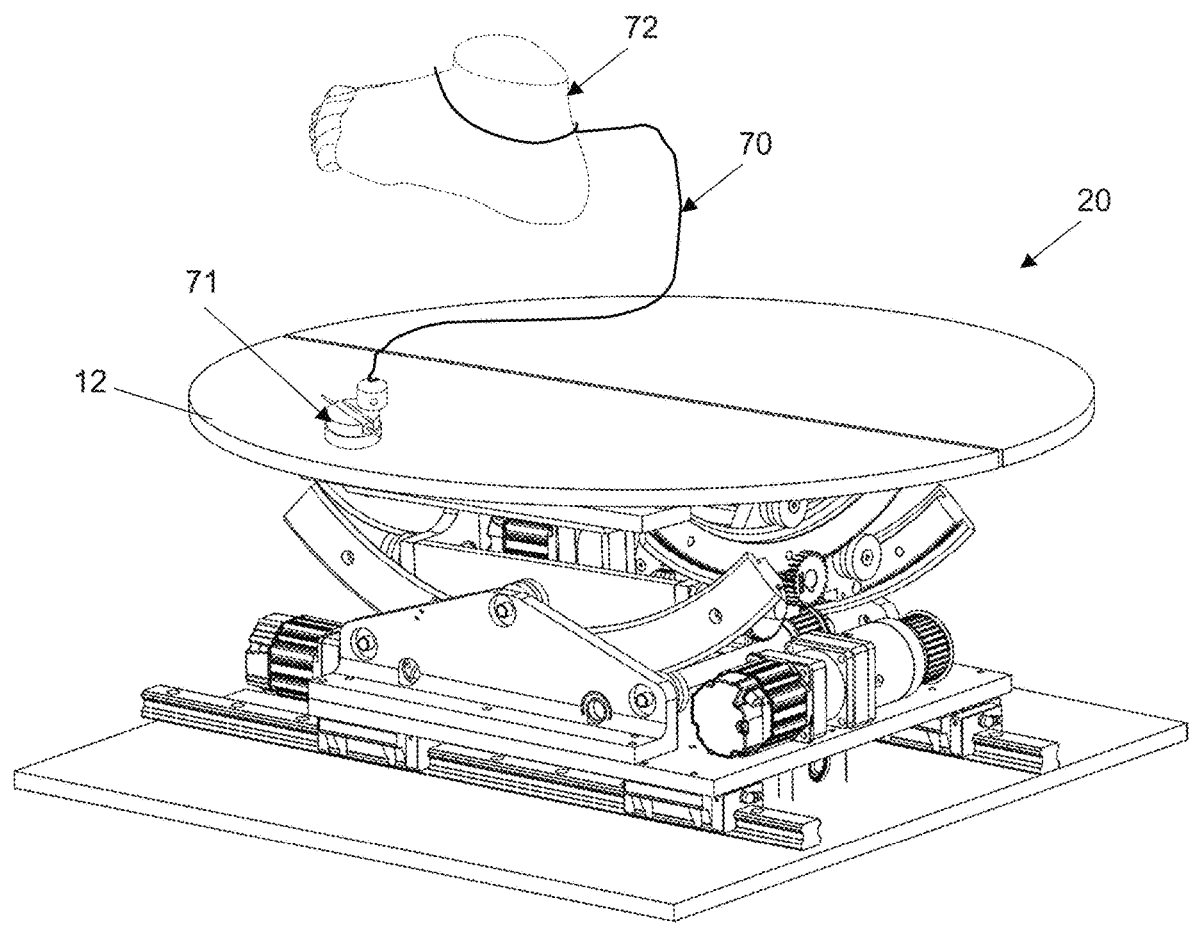
FIG. 5 is an illustration of an embodiment of a device including a magnetic breakaway safety lanyard according to embodiments of the present disclosure.

In various embodiments such as shown in FIG. 5, one or more safety lanyards 70 are secured to the balance platform 12 for attachment to a magnetic breakaway device 71 at one end and to a user's body such as an ankle 72 at another end. There can be one lanyard 70 and one magnetic breakaway device 71 per ankle. The lanyard 70 and device 71 can assist the user by, for example, triggering the balance device 20 to stop moving and/or powering off the device 20 when the lanyard is separated from the breakaway device. For example, if a user loses balance and force is applied such that the magnet breaks free, platform power can be disconnected. A magnet in the breakaway device 71 is used to allow quick connection during setup and also provides minimal resistance on breakaway so the user does not feel constrained. A magnetic reed switch as part of the breakaway device 71 can provide electrical contact inside the balance device 20.

It will be appreciated that embodiments of the device 20 can include the medial-lateral curved track assembly 24 and the anterior-posterior curved track assembly 26 without the linear slide rail(s) 90 and linear slide(s) 92. Other embodiments of the device 20 can include the medial lateral curved track assembly 24 with linear slide rail(s) 90 and linear slide(s) 92 but without the anterior-posterior curved track assembly 26. Further embodiments of the device 20 can include the anterior-posterior curved track assembly 26 with linear slide rail(s) 90 and linear slide(s) 92 but without the medial-lateral curved track assembly 24. Still further embodiments of the device 20 can include the medial-lateral curved track assembly 24, the anterior-posterior curved track assembly 26 and the linear slide rail(s) 90 and linear slide(s) 92, wherein the configuration of the device can incorporate one, two or all three of these elements as desired for the particular use or environment where deployed.

Figure 6:
FIG. 6 is an exemplary image displayed in a VR headset in accordance with embodiments of the present disclosure.

Referring back to FIG. 1, embodiments of the system 10 include a balance device 20 as described in various embodiments herein, where the device 20 is operable to rotate in at least one plane, a camera-based motion tracking system 80 communicably coupled to the balance device 20 and operable to obtain a joint angle measurement of a user and further operable to control a platform angle of the balance device 20 based on the obtained joint angle measurement, and a visual subsystem 85 communicably coupled to the motion tracking system 80 and operable to manipulate visual feedback to the user during operation of the balance device 20. The visual subsystem 85 can include a headset 89 with a display, a processor and a memory storing instructions that, when executed by the processor, cause the processor to adapt a visual field for a user 15 via the display. In various embodiments, the headset and display are operable with virtual reality displays. An exemplary display is shown at 88 in FIG. 6. As disclosed elsewhere herein, the balance device 20 can operate to rotate in two planes and/or translationally according to certain embodiments. The motion tracking system 80 can include a control device 40, one or more optical or depth camera(s) 82 and a computing device 84 communicably coupled to the camera(s) 82, control device 40 and/or balance device 20. The camera(s) 82 can be positioned at different heights depending upon the desired field of view.

The computing device 84 and control device 40 can include one or more processors and a memory storing instructions for operations as described herein. The control device 40 communicates with the drive motors 38, 58 and/or 94 of the balance device 20 to drive motion of the curved motion tracks 30, 50 in accordance with software programming to facilitate operations such as described herein. Communication can occur in wired or wireless fashion as will be appreciated by one of ordinary skill. Motion commands for each track can be computed by a remote computing device 84 such as a personal computing device, for example, depending on the operational mode. In one operational mode, the platform angles are pre-determined and function independently from the patient's motion (e.g., a wave simulation). In another operational mode, the patient's sway angles drive the platform motion so that the patient feels as if they are standing on an unsteady surface. In this mode, the sway angle information can be computed by the computing device 84 from either the force sensors 42 in the platform, or from the body joint angles observed by the depth cameras 82. In various embodiments, the ability to change the response of the surface (i.e., its friction and damping) are provided with software-configurable parameters.

In accordance with the present disclosure, the motion tracking system 80 is operable to obtain a joint angle corresponding to an ankle joint, knee joint or hip joint of the user. In various embodiments, the computing device 84 can process instructions to transform the visual field for the user via the display in the visual subsystem 85 based on a perceived center of pressure on the balance device 20 caused by the user. The perceived center of pressure can be measured by the torque sensor(s) 42, which can also be communicably coupled to the control device 40. In addition to the above, the computing instructions can cause the processor to adapt the visual field for the user via the display based on the obtained joint angle measurement.

In various embodiments, the system provides extensive capabilities beyond standard balance tests, including fully programmable gains, arbitrary motion profiles, an enhanced VR experience with custom-designed environment processing software, the ability to show the subject's body and environment within the field of view, and acquisition of body joint angles and related metrics during tests. The real-time measurement of body joint angles enables an alternative, improved method to perform sway-referenced platform control. The system's motion and measurement capabilities allow expanded, multi-plane definition of metrics such as sway path energy and 360-degree limits of stability. As patients use the system, their responses can be recorded using the integrated force sensors 42 as well as the camera-based motion tracking system 80.

As described elsewhere herein, the platform's motion configuration provides a rotation center above the platform surface approximately at ankle level, although configurations can support a rotation center at other joint levels. In various embodiments, the platform can accurately produce rotational motions in any combination of anterior-posterior/sagittal and lateral/coronal planes up to +/−20 degrees with rates up to 50 degrees/second, for example. The use of direct drive motors 38, 58, 94 improves system response time as compared to conventional linear actuators and lowers the achievable platform height. In embodiments, the motion platform measures twenty-two inches in diameter and nine inches in height and weighs only seventy pounds. The system includes a translational axis to provide motor control test (MCT) functionality, a helpful precursor to postural tests in initial evaluation.

The sensory organization test utilizes a form of platform control known as sway-referenced control. The goal of sway-referenced surface control is to remove the somatosensory feedback by keeping the ankle joint stationary. In this sense, the platform 12 can move its axes in response to an individual's center of mass. The relationship between center of pressure (which is measurable) and center of mass (which is not measurable) is a second order differential equation for which an algebraic relationship cannot be defined. Past computerized dynamic posturography (CDP) systems exhibit phase lag issues in the sway referenced platform motion at higher frequencies. The device and system according to the present disclosure does not exhibit this phase lag. The system according to the present disclosure includes an improved method of determining sway reference platform angles by directly measuring body joint angles using motion capture (skeletal tracking) software. However, a force plate is still included for backward-compatibility with systems that use a COP-based method for determination of sway reference angles.

Using a virtual reality headset according to embodiments of the present disclosure, the system of the present disclosure incorporates forms of visual field manipulation that seek to duplicate the effect of sway-referenced visual field control in CDP systems. By removing correct visual cues, the use of a VR headset enables greater control over the posturography process. Two methods of visual field alteration can be implemented. In static image mode, the headset image is constant over time, providing the human visual system with conflicting information. This is analogous to wearing a hood over one's head and implements a true sway-referenced visual field. Although this form of visual information is considered an optimal approach for sway referenced visual fields, it also appears to be imperfectly implemented in commercial CDP systems, in which a moving visual surround rotates. In this sense, these past systems represent an imperfect standard for sway referenced vision since an individual may still gain spatial cues by moving their head within the field of view, even when the visual field is rotating in the sagittal plane. As a result, a second (dynamic image) mode of visual manipulation in accordance with the present disclosure can be implemented for compatibility purposes, where the field of view emulates an environment rotating with the sway-reference signal, but within which the individual is free to look around. This effect is analogous to being located beneath deck on a ship with no inertial frame visual reference. In dynamic image mode, the displayed image is computed based on the relative motion between the headset and platform.

Figure 7:
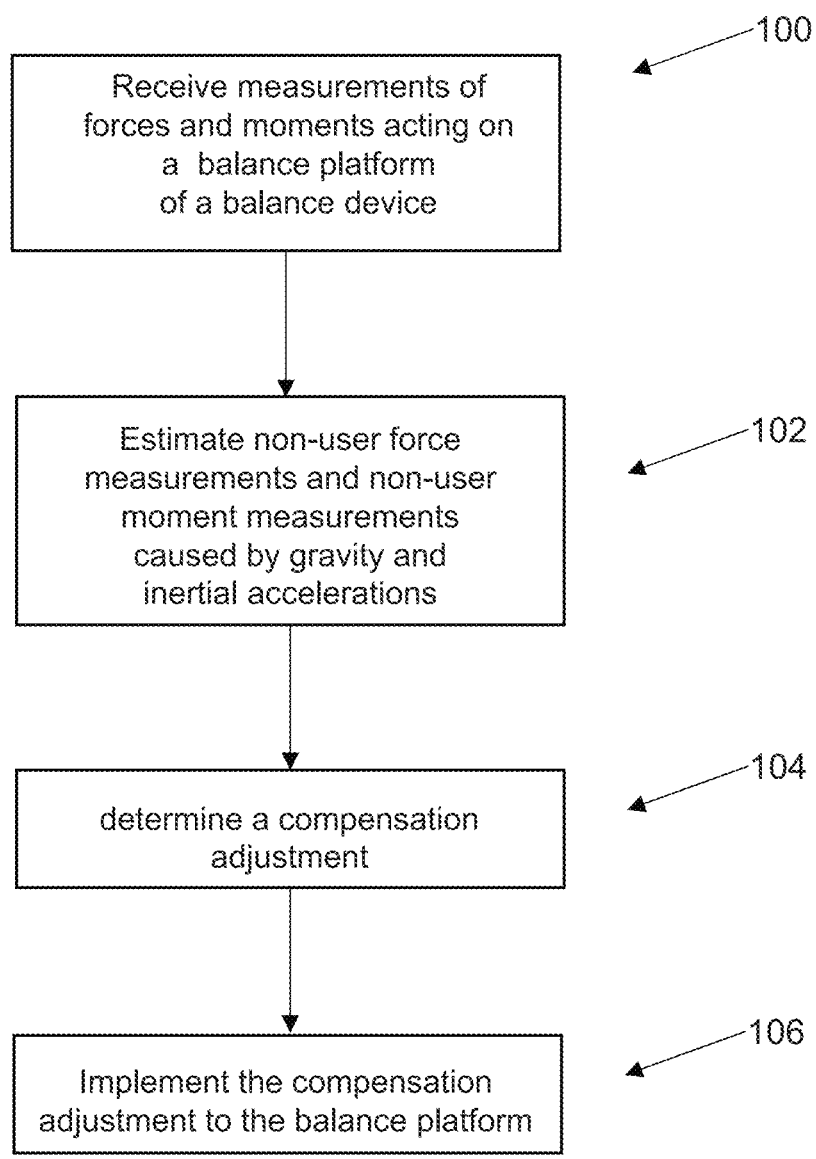
FIG. 7 is a block diagram illustrating a method according to embodiments of the present disclosure.

As shown in FIG. 7, embodiments of a method according to the present disclosure are shown including as at 100, receiving, by a control device, measurements of forces and moments acting on a balance platform of a balance device. As described elsewhere herein, the balance device is operable to rotate in at least one plane intersecting a joint of a user and wherein the balance device comprises a plurality of force/torque sensors adapted to measure the plurality of forces and the plurality of moments acting on the balance platform. As at 102, the control device estimates non-user force measurements and non-user moment measurements caused by gravity and inertial accelerations. As at 104, the control device determines, based on the non-user force measurements and non-user moment measurements, a compensation adjustment. As at 106, the compensation adjustment is implemented to the balance platform via a change in an angle of the balance platform or a change in an acceleration of movement of the balance platform.

In operation, a user 15 can step onto the standing surface 14 to access the balance platform 12. The user can don the headset 89 of the visual subsystem 85 and can optionally place one or more lanyards around his or her ankle before placing his or her feet on the balance platform 12. It will be appreciated that the user 15 may place his or her left foot on the left foot plate 17 and his or her right foot on the right foot plate 18 in embodiments where the balance platform is divided into left 17 and right 18 foot plates. The computing device 84 can execute programming instructions to effectuate different balance plate motions via one or more of the drive motors 38, 58, 94 based on the configuration of the device 20 and on the operational mode. As described elsewhere herein, inn one operational mode, the platform angles are pre-determined and function independently from the patient's motion (e.g., a wave simulation). In another operational mode, the patient's sway angles drive the platform motion so that the patient feels as if they are standing on an unsteady surface. In this mode, the sway angle information can be computed by the computing device 84 from either the force sensors 42 in the platform, or from the body joint angles observed by the depth cameras 82. In various embodiments, the ability to change the response of the surface (i.e., its friction and damping) are provided with software-configurable parameters. Also as described elsewhere herein, in various embodiments, the computing device 84 can process instructions to transform the visual field for the user via the display in the headset 89 based on a perceived center of pressure on the balance device 20 caused by the user 15. In such operational modes as described herein, balance disorders can be diagnosed and patients with impaired balance can be trained to improve balance and posture.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device such as integrated with or as part of control 40 and/or computing device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Aspects of the present disclosure are described herein with reference to flowchart illustrations and/or block diagrams of methods, apparatuses (systems) and computer program products according to embodiments of the disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, as exemplified above. The program code may execute entirely on a computing device such as computing device 84, partly on a computing device such as 84, partly on a control device 40 and partly on a visual subsystem 85 or entirely on one of such elements. The computing device 84 may be connected to the control device 40 and visual subsystem 85 through direct connections (wired or wireless) as well as through any type of network, including a local area network (LAN) or a wide area network (WAN).

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" as used herein refers to various configurations of: (a) one or more controls or controllers; (b) one or more computing devices, such as desktop computers, laptop computers, tablet computers or computing devices, personal digital assistants, mobile phones, other mobile computing devices in communication with control device 40, visual subsystem 85, headset 89 and/or or a controller; and/or (c) one or more controls or controllers in communication with one or more balance platforms with or without one or more additional elements as described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementations that may all generally be referred to herein as a "circuit," "module," "component," or "system."

The invention claimed is:

1. A device, comprising:
   a base frame;
   a first curved track assembly comprising a first pair of spaced curved track segments secured to the base frame in substantially parallel relation and rotatable about a first axis, wherein each curved track segment of the first pair of spaced curved track segments comprises first and second end surfaces;
   a support platform secured to the first and second end surfaces of each curved track segment of the first pair of spaced curved track segments;
   a balance platform secured to the support platform;
   at least one linear slide rail; and
   at least one linear slide secured to an underside of the base frame, whereupon the base frame is slidable in a translational direction along the linear slide rail.

2. The device of claim 1, further comprising:
   a second curved track assembly comprising a second pair of spaced curved track segments secured to the base frame in substantially parallel relation and rotatable about a second axis, wherein the second pair of spaced curved track segments are substantially perpendicular to the first pair of spaced curve track segments.

3. The device of claim 2, wherein the first and second axes intersect above the balance platform.

4. The device of claim 3, wherein a first radial distance from the first axis to the first pair of spaced curved track segments is less than a second radial distance from the second axis to the second pair of spaced curved track segments.

5. The device of claim 2, wherein the second curved track assembly further comprises a primary frame secured to the base frame and an anterior/posterior drive assembly operable to rotationally drive the second pair of spaced curve track segments about the second axis.

6. The device of claim 2, wherein the first curved track assembly further comprises an intermediate frame and a medial/lateral drive motor operable to rotationally drive the first pair of spaced curve track segments about the first axis.

7. The device of claim 6, wherein the intermediate frame and the medial/lateral drive motor of the first curved track assembly are nested within the second curved track assembly.

8. The device of claim 1, further comprising a pair of force torque sensors secured between the balance platform and the support platform.

9. A system, comprising:
- a balance device operable to rotate in at least one plane;
- a camera-based motion tracking system communicably coupled to the balance device and operable to obtain a joint angle measurement of a user and further operable to control a platform angle of the balance device based on the obtained joint angle measurement; and
- a visual subsystem communicably coupled to the motion tracking system and operable to manipulate visual feedback to the user during operation of the balance device.

10. The system of claim 9, wherein the visual subsystem comprises a headset comprising a display, a processor and a memory storing instructions that, when executed by the processor, cause the processor to adapt a visual field for a user via the display.

11. The system of claim 9, wherein the balance device is operable to rotate in two planes.

12. The system of claim 9, wherein the balance device comprises:
- a base frame;
- a first curved track assembly comprising a first pair of spaced curved track segments secured to the base frame in substantially parallel relation and rotatable about a first axis, wherein each curved track segment of the first pair of spaced curved track segments comprises first and second end surfaces;
- a support platform secured to the first and second end surfaces of each curved track segment of the first pair of spaced curved track segments; and
- a balance platform secured to the support platform.

13. The system of claim 12, wherein the balance device further comprises at least one linear slide rail and at least one linear slide secured to an underside of the base frame, whereupon the base frame is slidable in a translational direction along the linear slide rail.

14. The system of claim 12, wherein the balance device further comprises a second curved track assembly comprising a second pair of spaced curved track segments secured to the base frame in substantially parallel relation and rotatable about a second axis, wherein the second pair of spaced curved track segments are substantially perpendicular to the first pair of spaced curve track segments.

15. The system of claim 12, wherein the balance device further comprises a pair of force torque sensors secured between the balance platform and the support platform.

16. The system of claim 9, wherein the motion tracking system is operable to obtain a joint angle corresponding to an ankle joint, knee joint or hip joint of the user prior to controlling the platform angle.

17. The system of claim 10, wherein the instructions cause the processor to transform the visual field for the user via the display based on a perceived center of pressure on the balance device caused by the user.

18. The system of claim 10, wherein the instructions cause the processor to adapt the visual field for the user via the display based on the obtained joint angle measurement.

19. A method, comprising:
- receiving, by a control device, measurements of a plurality of forces and a plurality of moments acting on a balance platform of a balance device, wherein the balance device is operable to rotate in at least one plane intersecting a joint of a user and wherein the balance device comprises a plurality of force/torque sensors adapted to measure the plurality of forces and the plurality of moments acting on the balance platform;
- estimating, by the control device, a plurality of non-user force measurements and a plurality of non-user moment measurements caused by gravity and inertial accelerations;
- determining, by the control device, based on the plurality of non-user force measurements and non-user moment measurements, a compensation adjustment; and
- implementing the compensation adjustment to the balance platform via a change in an angle of the balance platform or a change in an acceleration of movement of the balance platform.

20. A device, comprising:
- a base frame;
- a first curved track assembly comprising a first pair of spaced curved track segments secured to the base frame in substantially parallel relation and rotatable about a first axis, wherein each curved track segment of the first pair of spaced curved track segments comprises first and second end surfaces;
- a support platform secured to the first and second end surfaces of each curved track segment of the first pair of spaced curved track segments;
- a balance platform secured to the support platform; and
- a second curved track assembly comprising a second pair of spaced curved track segments secured to the base frame in substantially parallel relation and rotatable about a second axis, wherein the second pair of spaced curved track segments are substantially perpendicular to the first pair of spaced curve track segments.

* * * * *